F. A. GREENFIELD.
ANTISKID DEVICE.
APPLICATION FILED APR. 9, 1921.

1,407,529.

Patented Feb. 21, 1922.
3 SHEETS—SHEET 1.

F. A. Greenfield
INVENTOR

BY Victor J. Evans
ATTORNEY

WITNESS:

F. A. GREENFIELD.
ANTISKID DEVICE.
APPLICATION FILED APR. 9, 1921.
1,407,529.
Patented Feb. 21, 1922.
3 SHEETS—SHEET 2.
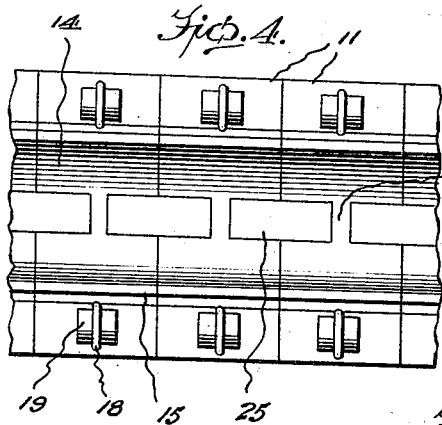
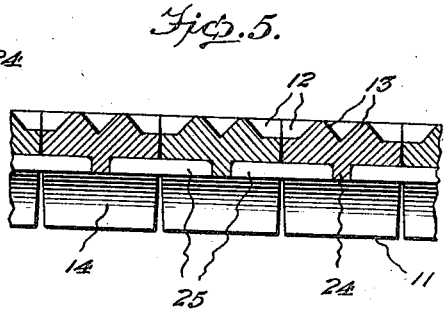
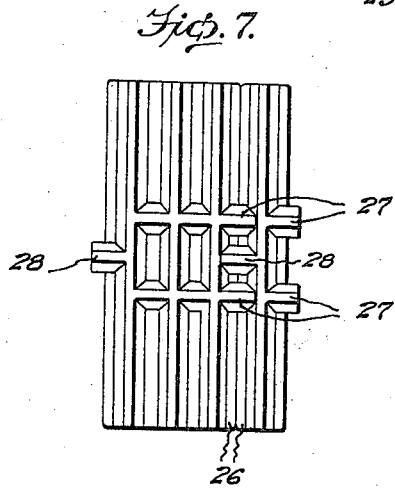
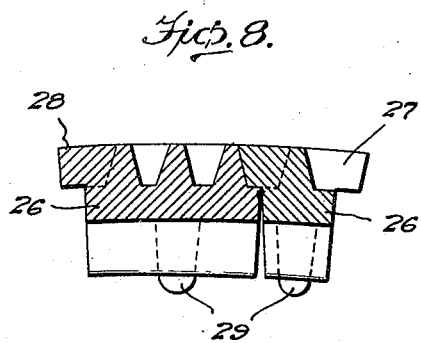
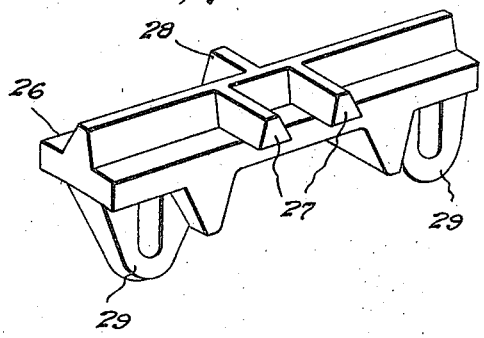
F. A. Greenfield
INVENTOR
BY Victor J. Evans
ATTORNEY

F. A. GREENFIELD.
ANTISKID DEVICE.
APPLICATION FILED APR. 9, 1921.

1,407,529.

Patented Feb. 21, 1922.
3 SHEETS—SHEET 3.

F. A. Greenfield
INVENTOR

BY Victor J. Evans
ATTORNEY

0
UNITED STATES PATENT OFFICE.

FRANK A. GREENFIELD, OF PERRY, OKLAHOMA.

ANTISKID DEVICE.

1,407,529.  Specification of Letters Patent.  Patented Feb. 21, 1922.

Application filed April 9, 1921. Serial No. 460,106.

*To all whom it may concern:*

Be it known that I, FRANK A. GREENFIELD, a citizen of the United States, residing at Perry, in the county of Noble and State of Oklahoma, have invented new and useful Improvements in Antiskid Devices, of which the following is a specification.

This invention relates to non-skid shoes for vehicle tires and has for an object the provision of a sectional shoe which may be secured to a tire for the purpose of preventing skidding and to provide increased traction for the vehicle without reducing the resilient qualities of the tire.

Another object of the invention is the provision of a shoe of the above character having a flexible connection between the sections, the character of this connection affording free movement between said sections without injury to the tire.

With the above and other objects in view, the invention further includes the following novel features and details of construction, to be hereinafter more fully described, illustrated in the accompanying drawings and pointed out in the appended claims.

In the drawings:—

Figure 4 is an inside plan view of a number of the shoe sections.

Figure 5 is a central longitudinal sectional view through Figure 4.

Figure 7 is a plan view showing a number of sections having a different interlocking engagement.

Figure 8 is central longitudinal sectional view of the same.

Figure 9 is a detail perspective view of one of the sections shown in Figures 7 and 8.

Figure 1:
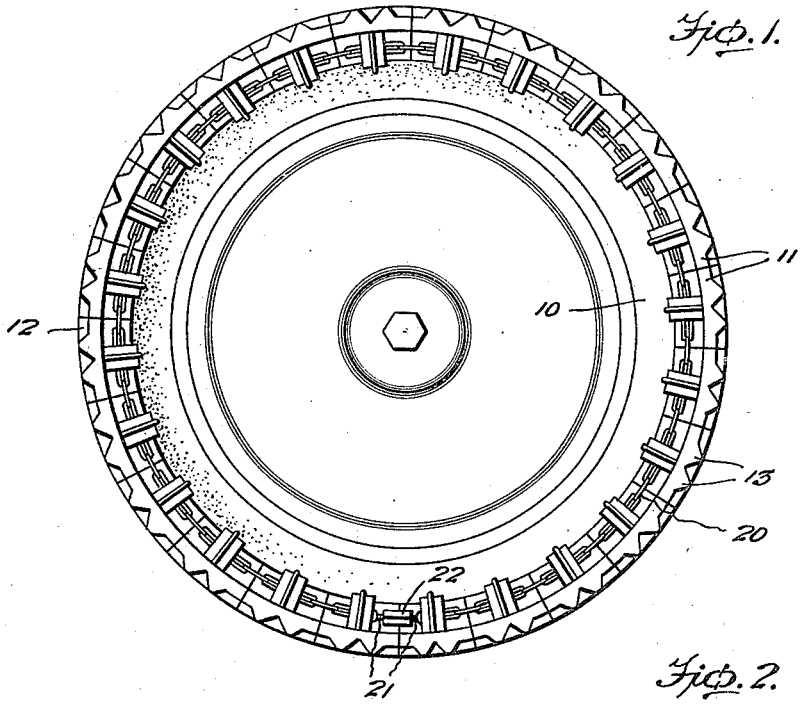
Figure 1 is a side elevation of a wheel with the invention applied thereto.
Figure 2:
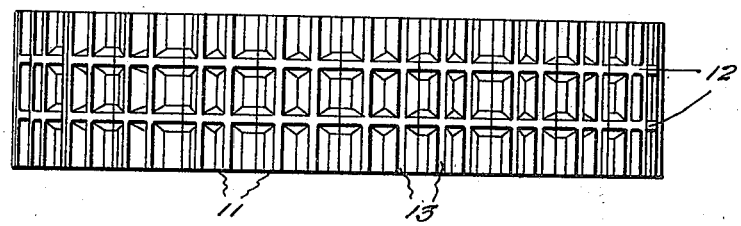
Figure 2 is an edge view of the same.
Figures 3, 6:
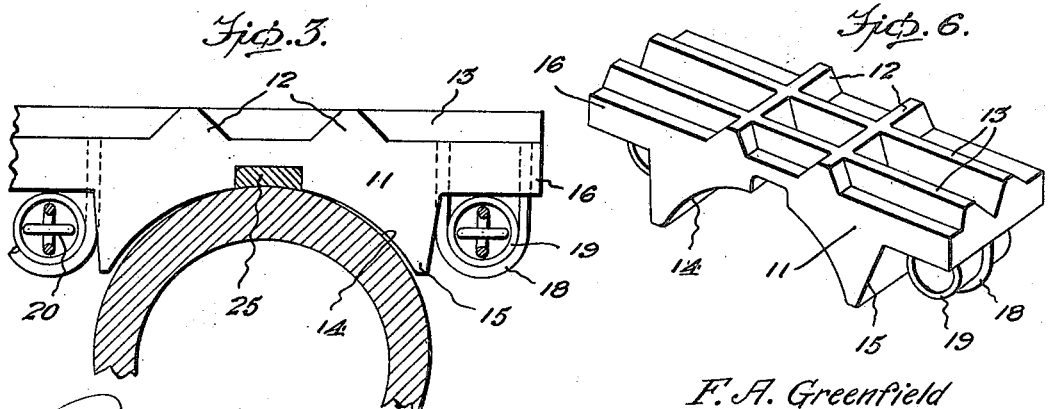
Figure 3 is a transverse sectional view on an enlarged scale.
Figure 6 is a detail perspective view of one of the sections.

Referring to the drawings in detail, wherein like characters of reference denote corresponding parts, the reference character 10 indicates a tire of pneumatic type, although the invention may be used in connection with other forms of tires, for example a solid rubber tire.

Referring particularly to Figures 1 to 6 of the drawings, the shoe is shown as comprising a number of separate sections 11, which are designed to be arranged transversely of the tire and have their tread surfaces formed in a manner to prevent skidding. This may be accomplished in various ways, the sections 11 being shown as provided with spaced ribs 12 and 13. When the sections are assembled upon the wheel, the ribs 12 will extend circumferentially, while the ribs 13 will be disposed transversely of the tread, so that in addition to the prevention of skidding, the shoe will act to increase the traction qualities of the wheel and permit it to travel over snow or ice covered roads.

The opposite face of each of the sections 11 is provided with a transverse seat so formed that when the sections are assembled there is provided a continuous groove 14 shaped to fit the tread of the tire. The cross sectional shape of this groove is substantially semi-circular, an annular flange being provided at each side of the groove by forming the sections with flanges 15 which extend transversely of the said sections. Extending outwardly from each of the sections beyond the flanges 15 are extensions 16, carrying upon their upper faces lugs or eyes 17. These lugs may be formed in various manners, either by being cast solidly with the sections, or by securing in each of the sections U-bolts or yokes 18, within which are gripped sleeves 19. These sleeves receive flexible members 20 herein shown in the form of chains. One of these chains is located upon each side of the tire, being threaded through the sleeves 19 of each section and having its ends provided with threaded bolts 21, the bolts at the opposite end of the chain having right and left hand threads. The bolts 21 are connected by means of a threaded sleeve 22, so that an annular flexible member is provided which serves to yieldingly hold the shoe sections upon the tire in a manner to permit them to go. The resiliency of the tire is thus maintained and at the same time the sections are securely held in place.

To further aid in maintaining the sections in proper position upon the tread of the tire, each of the sections is provided within the groove 14, with a socket 23. These sockets extend inwardly from each edge of the sections, being divided by a central rib 24. Seated within the sockets and extending from one section to the socket of the adjacent section, are bars 25, the latter having a relatively snug fit within the sockets, yet permitting sufficient play between the sections. The construction of the sockets and bars is such that the outer face of the bars is flush with the surface of the groove 14, so as not to injure the tire.

In the construction shown in Figures 7 and 8, the sections, which are indicated at 26 are substantially the same as the shoe sections previously described. The sections 26 are however, not provided with the sockets 23, but an interlocking connection between these sections is effected by forming the tread surface of each section with a pair of spaced lugs 27 which project beyond one edge thereof, while at the opposite edge there is provided a single lug 28. This last mentioned lug of one section is adapted to be received between the spaced lugs 27 of the next adjacent section, so that relative lateral movement between the sections is limited, at the same time free radial movement is provided for. In addition, the shoe sections 26 are provided with eyes 29 which are formed integral with the sections and which receive flexible members 20.

Figure 10:
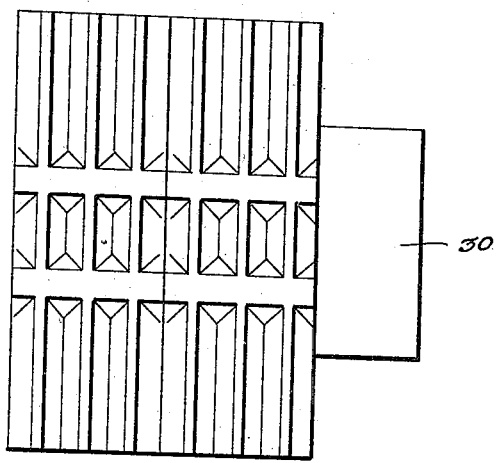
Figure 10 is a plan view of two sections of the shoe showing a further modified form of the device.
Figure 11:
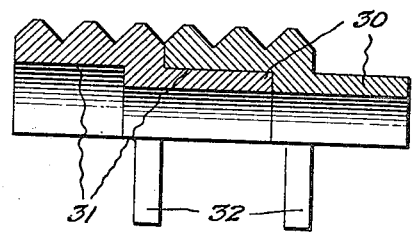
Figure 11 is a detail section similar to Figure 5, but illustrating the form of the invention shown in Figure 10.
Figure 13:
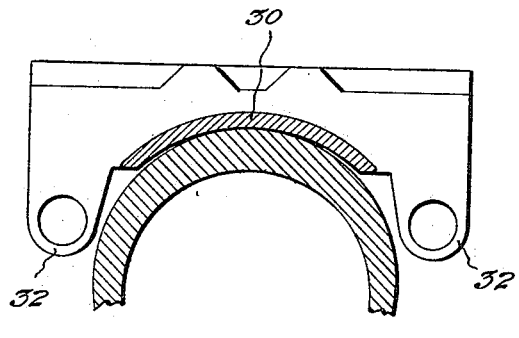
Figure 13 is a transverse sectional view showing a portion of a tire with the invention applied.
Figure 12:
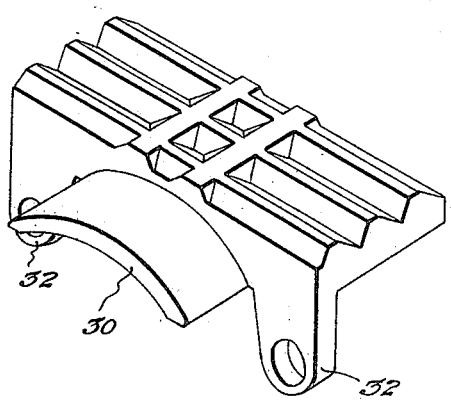
Figure 12 is a detail perspective view of one of the shoe sections.

In the form of the invention illustrated in Figures 10 to 12 inclusive, each section is shown as formed with a laterally extending projection 30 which extends from one side of the section and is of concavo-convex cross sectional shape. This extension 30 is designed to be received within a concaved seat 31 formed in the sections, the said seat extending inwardly from one side edge of the section to a point adjacent the opposite side edge, so that it extends for a major portion of the width of the section. When the sections are jointed together the inner faces of the extensions 30 are flush and provide an annular groove or seat for the reception of the tread of a tire. The shoe is designed for use with a tire of such diameter that only the tread surface of the tire engages the annular groove or seat, so that the side walls of the casing are permitted to expand under increased pressure or shocks or of jars and the resiliency of the tire is thus not impaired. Located at each end of each of the sections is an eye 32, which is preferably formed integral with the sections and extends upward from one side edge and is thus located adjacent the joint between the sections so that a pull is distributed throughout the surrounding sections. Due to the character of the joint between the sections, the latter cannot tilt or tip as they engage the surface of the ground and as the joint is practically at the center of the sections, the freest flexibility is at all times maintained.

It is preferred to form the tread surfaces of the shoe sections with non-skid ribs, the ribs of the sections which are attached to the front wheels extending transversely of the sections and circumferentially of the wheel, while the ribs of the sections which are carried by the rear wheels preferably extend both transversely and longitudinally of the said sections and transversely and circumferentially of the wheel, as clearly illustrated in the drawings.

The invention is susceptible of various changes in its form, proportions and minor details of construction and the right is herein reserved to make such changes as properly fall within the scope of the appended claims.

Having described the invention what is claimed is:—

1. A non-skid shoe for vehicle tires comprising a plurality of separate sections, each of said sections being arranged transversely of the tire and formed with a transversely disposed depression, which, when the sections are assembled forms an annular tire receiving groove, eyes carried at the outer ends of said sections, a flexible element threaded through the eyes, sockets located centrally of the annular tire receiving groove and extending inwardly from each edge of the sections and bars located within the sockets and extending from the socket of one section to the socket of the adjacent section to provide a flexible connection between the sections.

2. A non-skid shoe for vehicle tires comprising a plurality of separate sections arranged transversely of the tire, said sections being concavoconvex in cross section and each having its inner face provided with an inwardly extending offset portion to define a seat which extends from one edge of the section to a point adjacent the opposite edge, a transversely arranged shoulder formed at the inner end of the seat and a tongue extending from the shoulder beyond the edge of the section for engagement with in the seat of the adjacent section and means whereby the sections may be secured in place upon the tire to provide a continuous tread.

In testimony whereof I affix my signature.

FRANK A. GREENFIELD.